Aug. 4, 1970          G. R. PLATT          3,522,967
COMBINATION CAMPER AND BOAT
Filed March 15, 1968          3 Sheets-Sheet 1
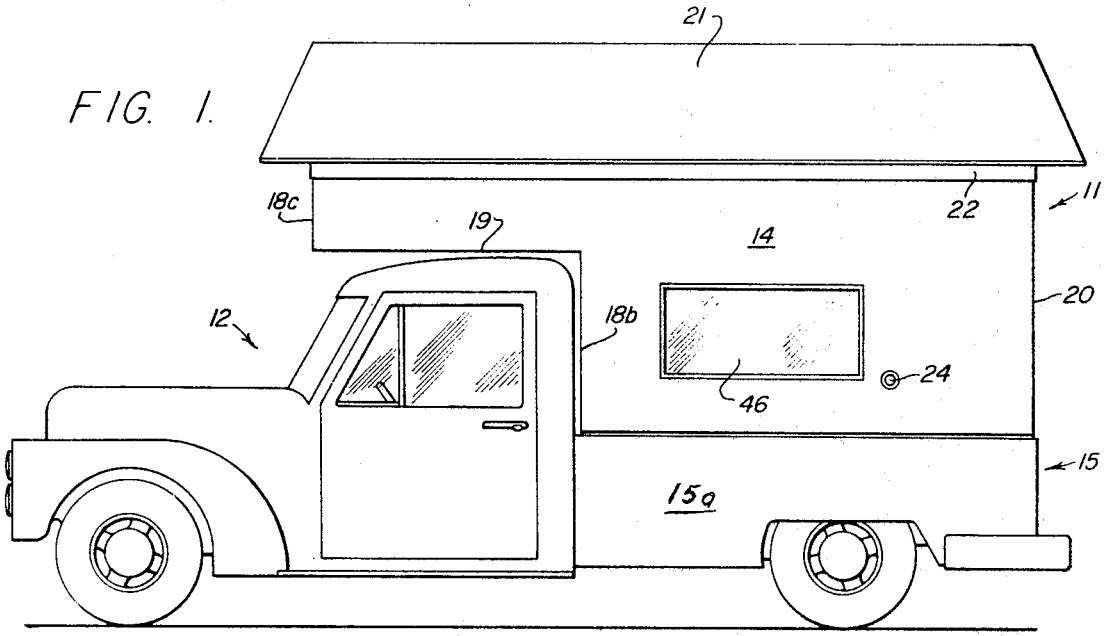
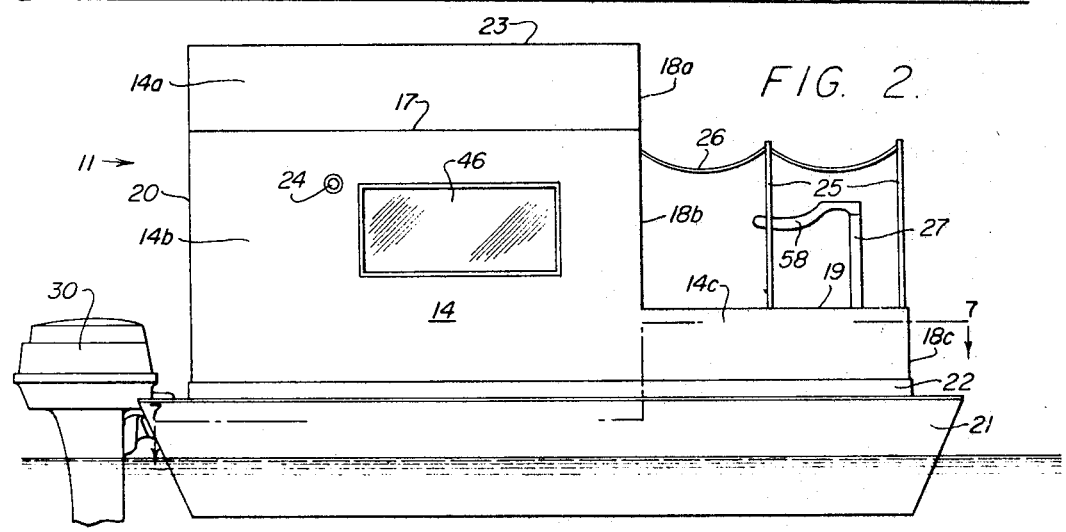
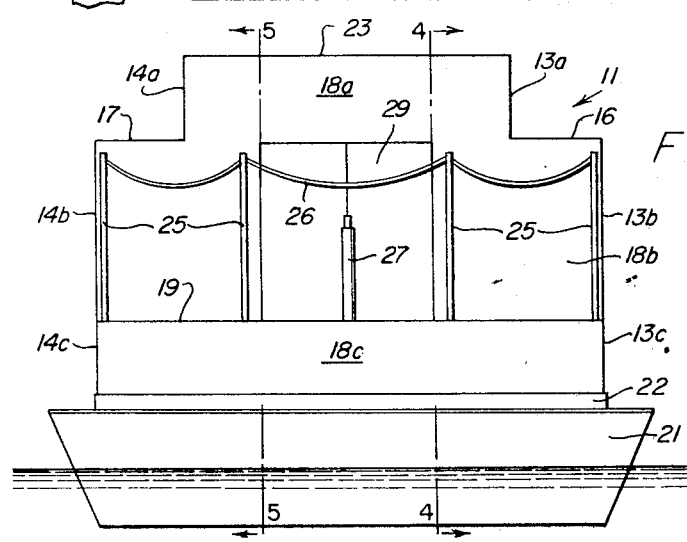
INVENTOR.
GERALD R. PLATT
BY *Mallinckrodt and Mallinckrodt*
ATTORNEYS Aug. 4, 1970     G. R. PLATT     3,522,967
COMBINATION CAMPER AND BOAT
Filed March 15, 1968     3 Sheets-Sheet 2
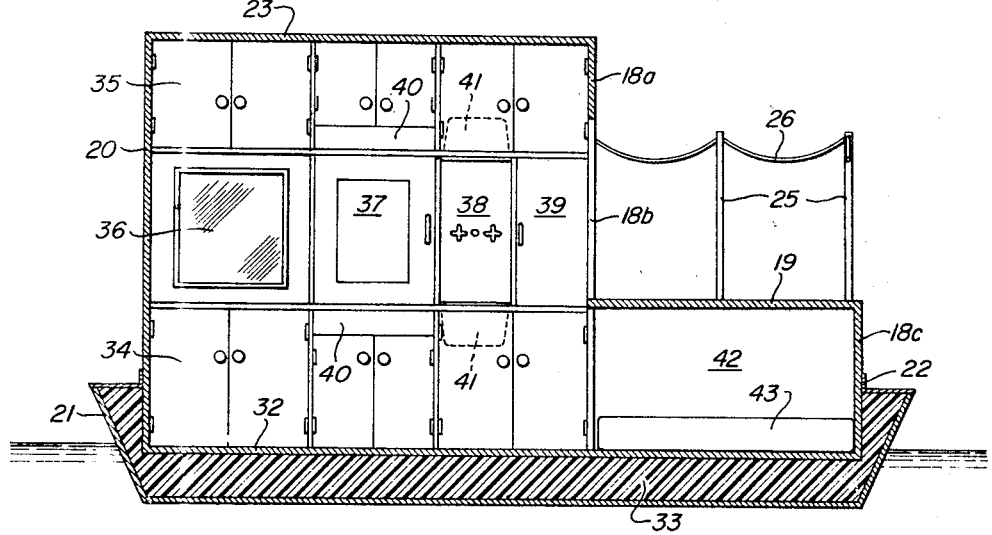
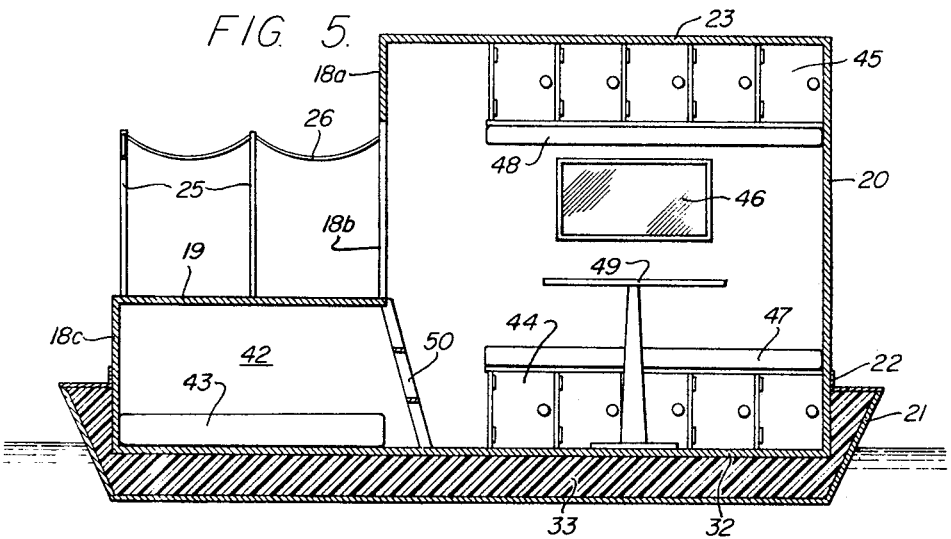
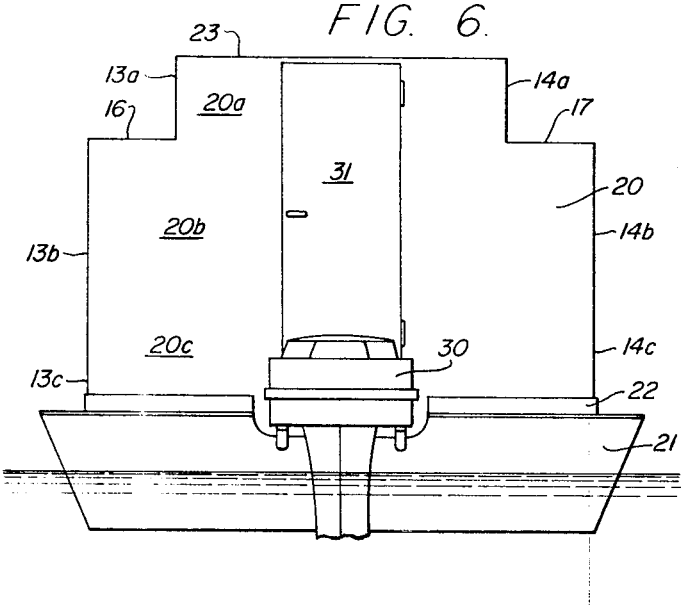
INVENTOR.
GERALD R. PLATT
BY *Mallinckrodt and Mallinckrodt*
ATTORNEYS Aug. 4, 1970 G. R. PLATT 3,522,967
COMBINATION CAMPER AND BOAT
Filed March 15, 1968 3 Sheets-Sheet 3

INVENTOR.
GERALD R. PLATT

BY *Mallinckrodt and Mallinckrodt*

ATTORNEYS

United States Patent Office 3,522,967
Patented Aug. 4, 1970

3,522,967
COMBINATION CAMPER AND BOAT
Gerald R. Platt, 5909 Emigration Canyon,
Salt Lake City, Utah 84108
Filed Mar. 15, 1968, Ser. No. 713,355
Int. Cl. B60p 3/42
U.S. Cl. 296—23
8 Claims

ABSTRACT OF THE DISCLOSURE

A transportable house, suitable for use as either a pick-up camper or a boat. Side and end walls are connected to form an enclosure shaped and dimensioned for emplacement in the box of a pick-up truck. The walls are also connected by a combination camper roof and boat hull. When the house is orientated for use as a pick-up camper, the combination roof and hull functions as a roof for the house. When the house is tipped over and oriented for use as a boat, the combination functions as a boat hull. The house may also include a combination camper floor and cabin roof, opposite the combination roof and hull, to function as a floor when the house is used as a pick-up camper and as a roof when the house is used as a boat. The interior of the house may be furnished with various cabinets and utilities which are adapted for use both when the house is oriented as a camper and when it is tipped over for use as a boat.

BACKGROUND OF THE INVENTION

Field

This invention relates to transportable houses and provides such a house which may either be placed in the box of a pick-up truck for use as a pick-up camper or tipped over and placed in the water for use as a cabin boat.

State of the art

Many portable and transportable houses are known to the art. Such houses are used by construction and logging crews, for example, as well as in connection with other occupations. Certain of these houses are transported by truck and are used as living quarters while remaining mounted in the box of a truck. Other such houses are mounted on rafts, pontoons or conventional boat hulls for use as cabin boats. With increased interest in outdoor pursuits, various types of transportable houses have become popular. For family camping and hunting expeditions, as well as for use by construction crews and the like, the well-known pick-up camper has found wide acceptance. A pick-up camper is a transportable house adapted for placement into the box of a pick-up truck. Often a section of the house extends over the cab of the truck to provide a sleeping space. The interior of a pick-up camper may be provided with various cabinets and utilities such as stove, refrigerator, and sink.

Various types of cabin boats are also available for recreational purposes. Among such boats are some which consist of a small house mounted on a boat hull. The boat may be powered by one or more inboard or outboard motors. The cabin may be provided with cabinets and utilities such as those provided in a camper. Often, a cabin boat is designed for ready transport from one launching site to another, typically by means of a special trailer.

SUMMARY OF THE INVENTION

The present invention provides a unique transportable house adapted for use either as a pick-up camper or as a boat. The transportable house of the present invention is constructed generally in the same fashion as presently available pick-up campers except that the roof of the house is constructed as a combination camper roof and boat hull. Thus, the house may be inverted from its position of use as a camper and placed with the combination roof and hull in the water so that the house may function as a cabin boat.

Generally, the transportable house includes side and end walls connected to enclose a living space which is shaped and dimensioned as a typical pick-up camper, i.e., for at least partial emplacement in the box of a pick-up truck. The side walls are not necessarily completely vertical, but may be contoured as necessary to enable the lower portion thereof to nest into the box of the pick-up truck while the major portion of the house, which is situated above the box of the truck when the house is emplaced therein, is wider than the box of the truck.

Similarly, the end wall intended for emplacement towards the front of the truck box is desirably of two sections. The first, or lower, section is dimensioned for emplacement adjacent the back of the cab of the truck; the second, or upper, section is spaced longitudinally from the first section by projections of the side walls, connecting the vertical edges of the side wall projections so that it is oriented vertically upward from the top of the truck cab. A combination floor and deck section connects the upper and lower sections of the end wall as well as the projections of the side walls. Accordingly, the enclosure defined by the side and end walls is often irregular in shape.

The combination roof and hull connects the side walls to define a roof when the house is oriented for use as a pick-up camper with the combination roof and hull at the top and to define the hull for a boat when the house is inverted and oriented for use as a boat with the combination roof and hull at the bottom.

The house ideally includes a combination floor and roof, connecting the edges of the side and end walls opposite the edges connected by the combination roof and hull. The combination floor and roof is dimensioned to fit on the bed of a pick-up truck to function as the floor of the camper when the house is emplaced in the box of the truck for use as a pick-up camper and to function as the roof of the cabin when the house is inverted for use as a cabin boat. According to some embodiments, the combination floor and roof is dispensed with so that the bed of the truck box functions as the floor of the pick-up camper. In these embodiments, the cabin boat is either open at the top or is provided with a separate covering, such as a tarpaulin, for the cabin roof.

DESCRIPTION OF THE DRAWINGS

In the drawings, which illustrate what is presently contemplated as the best mode of the invention:

FIG. 1 is a side view showing the transportable house mounted as a pick-up camper in a pick-up truck;

FIG. 2, a side view of the house inverted for use as a cabin boat;

FIG. 3, an end view showing the front of the cabin boat;

FIG. 4, a cross sectional view taken along the line 4—4 of FIG. 3, and showing details of the internal layout of the cabin boat.

FIG. 5, a similar cross-sectional view taken along the line 5—5 of FIG. 3;

FIG. 6, an end view showing the stern of the cabin boat;

DESCRIPTION OF THE ILLUSTRATED EMBODIMENT

Figure 7:
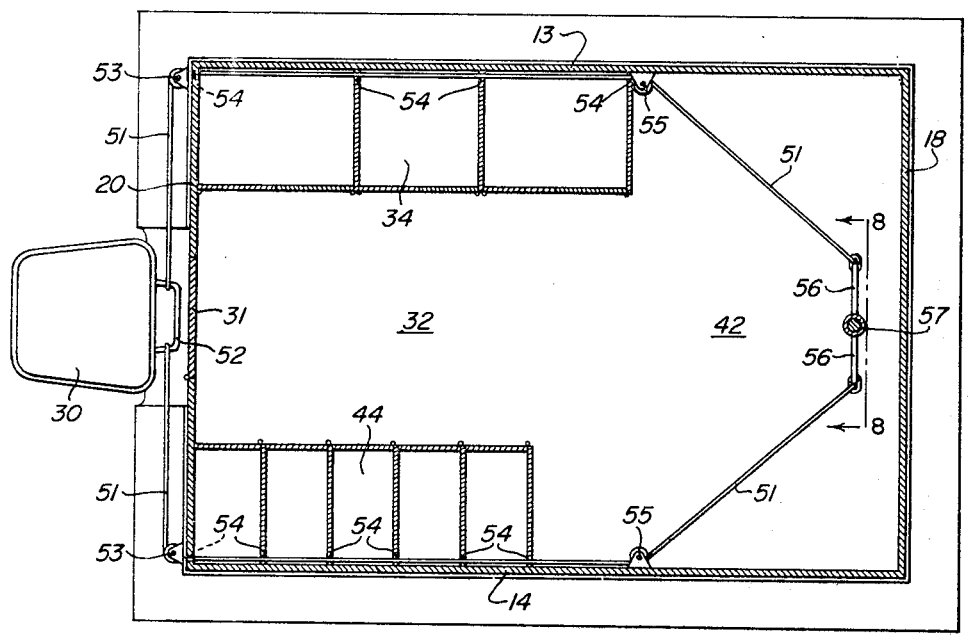
FIG. 7, a top view of the cabin boat in section taken along the line 7—7 of FIG. 2.

FIG. 1 illustrates the transportable house 11 mounted in a pick-up truck 12 as a pick-up camper. The side walls 13 and 14 are each of two piece construction, the first piece of each wall being designated section a and the second piece of each wall including two sections, designated b and c, respectively. The respective sections of the side walls are shaped and spaced as illustrated by FIGS. 2 and 3 for placement into the box 15 of the truck. Thus, side wall sections 13a and 14a are spaced appropriately to fit within the width of a standard pick-up box 15 and are of sufficient height to extend above the side walls 15a of the box 15 when the house 11 is mounted in the box. Sidewall sections 13a and 14a are connected to side wall sections 13b and 14b, respectively, by bench sections 16 and 17, respectively. The front end wall 18 is also of two piece costruction and includes three sections, 18a, 18b, and 18c, respectively, which connect correspondingly designated sections of the side walls. Section 18b is connected by a combination floor and deck section 19 to section 18c. End wall section 18a is shaped and dimensioned as illustrated in FIG. 3 to connect side wall sections 13a and 14a, and bench sections 16 and 17. End wall section 18b connects side wall sections 13b and 14b with the combination floor and deck section 19. End wall section 18c connects the combination floor and deck section 19 with side wall sections 13c and 14c. Back end wall 20 (FIG. 6), which is of one piece construction, connects the edges of the side walls 13 and 14 along their entire heights. For consistency of description, the back end wall is considered to include three sections, 20a, 20b, and 20c which connect corresponding side wall sections 13a, b, and c with corresponding side wall sections 14a, b, and c. The combination roof and boat hull 21 is connected to the end wall section 18c, side wall sections 13c and 14c, and back end wall section 20c by means of a water tight seal 22 which extends around the perimeter of the house 11. A combination camper floor and cabin roof 23 connects side walls 13a and 14a with end wall section 18a and back end wall section 20a.

The assembled side walls, end walls, combination camper roof and boat hull, and combination camper floor and cabin roof provide an enclosed living and storage space, both when the enclosure or house is oriented as illustrated in FIG. 1 for use as a pick-up camper and when the house is oriented as illustrated in FIG. 2 as a cabin boat.

Placement of the house 11 ito the pick-up truck box 15 and removal of the house therefrom is accomplished in conventional manner. Thus, special receptacles 24 are provided on either side of the transportable house to receive jacks or similar hoisting devices. These receptacles also serve as hand holds for manual manipulation of the transportable house.

Figure 8:
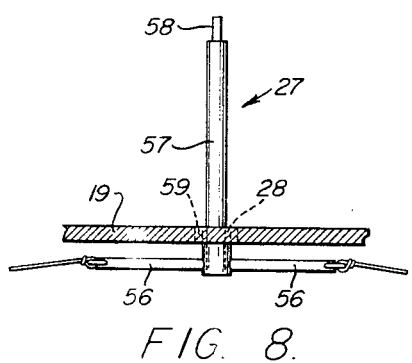
FIG. 8, a front view, with the deck in section, of the steering mechanism of the boat, taken along the line 8—8 of FIG. 7.

When the transportable house is oriented as a cabin boat, a removable guard rail, consisting of posts 25 and rope or cable 26, is fastened to deck section 19 as illustrated. A removable tiller 27 is also positioned into a socket 28 provided in deck 19 as illustrated in FIG. 8. Access to the tiller at the front of the boat is through a door 29 in front end wall 18. Access to the motor 30 at the stern of the boat is through a door 31 in end wall 20 (FIG. 6).

In the illustrated embodiment, a bottom deck section 32 (FIGS. 4 and 5) joins back end wall 20, front end wall section 18c, and side walls sections 13c and 14c; and the combination boat hull and camper roof is mounted externally of the walls and deck to define a water tight space 33. This space may be filled with air or it may be packed with any suitable filler such as polyurethane foam to provide buoyancy for the boat.

FIGS. 4 and 5 illustrate the arrangement of storage space and utilities inside the transportable house. Although the arrangement is illustrated and described with the house oriented as a cabin boat, the illustrated arrangement is suitable for use when the house is inverted to its orientation of use as a pick-up camper. Referring to FIG. 4, a series of base cabinets 34 and wall cabinets 35 are provided along the inside of side wall 13. Between these cabinets are provided a window 36, stove 37, water supply 38, and refrigerator 39. The stove 37 includes burners 40 at both top and bottom, and the water supply 38 feeds sinks 41 at either top or bottom. The utilities, and cabinets are all adapted for use in either the orientation illustrated or when the house is inverted for use as a pick-up camper.

Deck section 19, end wall section 18c, side walls sections 13c and 14c, and deck section 32 enclose a sleeping area 42 in which there is illustrated a mattress 43 resting on deck 32. When the house is inverted for use as a pick-up camper, the mattress 43 rests on the floor surface of the combination floor and deck 19.

Referring to FIG. 5, a second series of base cabinets 44, and wall cabinets 45 is mounted to side wall 14. A window 46 is provided through this wall also. Cushions 47 are mounted on base cabinets 44 and wall cabinets 45 to function as bench cushions. Cabinets 45 are of less depth than cabinets 44 due to the restricted width of the house adjacent wall sections 13a and 14a. The removable table 49 may be positioned between cabinets 44 and 34 for use by persons seated on cushion 47 when the house is used as a cabin boat. When the house is used as a pick-up camper, the table may be positioned between cabinets 45 and 35 for use by persons seated on cushion 48. A removable ladder 50 is positioned as illustrated to provide access through door 29 to the front of the boat on top of the deck surface of the combination floor and deck 19.

FIGS. 7 and 8 illustrate the steering mechanism or helm arrangement of the cabin boat. As shown by FIG. 7, ropes or cables 51 extend from attachmet to the handle 52 of the motor 30 through back corner pulleys 53; through rope ports 54 in end wall 20 and base cabinets 34 and 44; through front pulleys 55, mounted below deck 19; and through sleeping compartment 42 to attachment to arms 56 of the tiller 27. The tiller 27 consists of a barrel 57, adapted for insertion in a socket 28; and a handle 58 (see FIG. 2). As illustrated, the arms 56 are connected directly to the socket 28 which turns in a receptacle 59 mounted in the deck 19. In use the boat is steered by moving the handle 58 of the tiller 27 thereby rotating the motor 30. The rudder of the motor is thereby reoriented.

Other embodiments of the invention are within contemplation according to which the internal furnishings of the house are either removably attached or unattached to the walls or decks. Further, the helm, or tiller, arrangement is optional. Embodiments adapted for mounting on trucks other than pick-up trucks are within contemplation. Reference herein to details of certain specific embodiments is not intended to limit the scope of the claims, except, insofar as the details are recited therein. Many embodiments which do not depart from the legitimate scope of the invention will be suggested to those skilled in the art by the present disclosure.

I claim:

1. A transportable house for use as either a camper or a boat, comprising side, end, bottom, and top walls all interconnected water tight to enclose a living space, said house having a base portion adapted for emplacement in the box bed of a pick-up truck, an intermediate portion rising from said base portion so as to fit behind the cab of the pick-up truck, and an upper portion extended at one end of the house beyond said base portion and said intermediate portion so as to project out over the cab of the pick-up truck, said upper portion being formed as a boat hull for floating said house on a body of water as a houseboat, with the normally bottom wall of the said upper portion providing a deck at one end and exteriorly of the said living space.

2. A transportable house as described in claim 1, wherein there is provided a door that opens from said living space onto said deck.

3. A transportable house as described in claim 2, including a guard rail adapted for protective positioning about the deck area when the house is floated as a boat.

4. A transportable house as described in claim 2, including means at an end of the upper portion of the house for mounting an outboard motor.

5. A transportable house as described in claim 4, including means for mounting a tiller at the opposite end of the upper portion of the house; and means for operably connecting the tiller with the outboard motor.

6. A transportable house as described in claim 1, including utility furnishings attached to the interior walls of the living space, said furnishing having dual utility portions arranged in reverse at upper and lower portions, respectively, of said living space.

7. A transportable house as described in claim 1, wherein there are double top walls spaced from each other, the outer of which is turned back toward the base portion of the house at the sides and ends of the house in spaced relationship to the side and end walls thereof; and means between the turned back portions of said outer top wall sealing the space between said double top walls.

8. A transportable house as described in claim 7, wherein the space between the double top walls is filled with a buoyant material.

References Cited

UNITED STATES PATENTS

| | | | |
|---|---|---|---|
| 3,248,083 | 4/1966 | De Gennaro | 296—23 |
| 2,847,136 | 8/1958 | Neff | 296—23 |
| 1,476,051 | 12/1923 | Cassell | 296—23 |

FOREIGN PATENTS 1,481,097  4/1967  France.

PHILIP GOODMAN, Primary Examiner

U.S. Cl. X.R.

9—1